United States Patent [19]
Angliker et al.

[11] 3,945,989
[45] Mar. 23, 1976

[54] FLUORO TRIAZINE CONTAINING WATER INSOLUBLE AZO DYESTUFF

[75] Inventors: Hans-Jorg Angliker; Richard Peter, both of Basel; Hans Wilhelm Liechti, Oberwil, all of Switzerland

[73] Assignee: Ciba-Geigy AG, Basel, Switzerland

[22] Filed: Aug. 24, 1973

[21] Appl. No.: 391,399

Related U.S. Application Data

[63] Continuation-in-part of Ser. No. 52,984, July 7, 1970, abandoned.

[30] Foreign Application Priority Data

July 11, 1969 Switzerland.................. 10662/69

[52] U.S. Cl. ............... 260/153; 260/158; 260/163; 260/197; 260/205; 260/206; 260/249.5; 260/249.8
[51] Int. Cl.² ................... C09B 29/36; C09B 43/12
[58] Field of Search .................................. 260/153

[56] References Cited
UNITED STATES PATENTS

| | | | |
|---|---|---|---|
| 2,945,021 | 7/1960 | Fasciati et al. | 260/153 |
| 3,040,022 | 6/1962 | Starn | 260/153 |
| 3,658,783 | 4/1972 | Knobloch et al. | 260/153 |
| 3,660,393 | 5/1972 | Ackermann et al. | 260/153 X |
| 3,663,524 | 5/1972 | Opitz | 260/153 |
| 3,711,460 | 1/1973 | Schondehutte | 260/153 X |

*Primary Examiner*—Charles F. Warren
*Attorney, Agent, or Firm*—Joseph G. Kolodny; Edward McC. Roberts; Prabodh I. Almaula

[57] ABSTRACT

A water-insoluble disperse dyestuff of the heterocyclic azo series of the formula

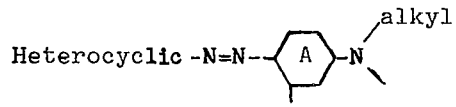

wherein A may be further substituted and one of the free valencies carries a fluorinated triazinyl group of the formula

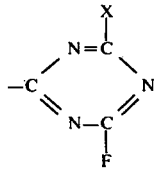

wherein X is chlorine or fluorine.

The dyestuff give fast yellow, red and blue shades on polyamide fibers.

4 Claims, No Drawings

FLUORO TRIAZINE CONTAINING WATER INSOLUBLE AZO DYESTUFF

CROSS-REFERENCE TO RELATED APPLICATION

This application is a continuation-in-part of application Ser. No. 52,984, filed July 7, 1970, now abandoned.

The present invention provides water-insoluble dyestuffs which do not contain groups that confer solubility in water, and which contain at least one fibre-reactive radical Z of a nitrogen-containing heterocyclic compound, the radical Z being substituted by at least one fluorine atom, and the or each radical Z being bonded to an amino group. The radical Z is especially a s-triazine radical which is substituted by at least one fluorine atom. Dyestuffs of particular interest are those which contain at least one s-triazine radical of the general formula

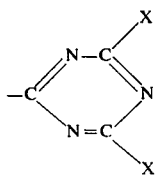

wherein one X represents a fluorine atom and the other X represents an organic radical (for example a hydrocarbon, especially an alkyl or aryl, radical, an alkoxy or an alkylthio radical), a free or substituted amino group or a halogen atom. Preferably, one X represents a fluorine atom and the other X represents a chlorine atom or especially a fluorine atom.

A radical Z containing only one halogen atom is preferably the 2-fluoro-4-amino-6-triazinyl, 2-fluoro-4-methylamino-6-triazinyl, 2-fluoro-4-phenylamino-6-triazinyl, 2-fluoro-4-diethyl-amino-6-triazinyl, 2-fluoro-4-methoxy-6-triazinyl, 2-fluoro-4(β-methoxyethoxy)-6-triazinyl, 2-fluoro-4-phenoxy-6-triazinyl, 2-fluoro-4-ethoxy-6-triazinyl, 2-fluoro-4-methylthio-6-triazinyl, 2-fluoro-4-phenyl-6-triazinyl, 2-fluoro-4-(methyl-, β-oxyethylmercapto-, phenylmercapto-)-6-triazinyl-, 2-fluoro-4-methyl-6-triazinyl or the 2-fluoro-4-ethyl-6-triazinyl radical. Of these, the alkyl-, phenyl- and alkoxy-fluoro-triazinyl radicals are particularly preferred.

Dyestuffs which may contain the fibre-reactive radical Z according to the invention are, for example, azo, especially monoazo and disazo, anthraquinone, pyridone, perinone, quinophthalone, styryl and nitro dyestuffs.

Azo Dyestuffs

The suitable azo dyestuffs include the monoazo dyestuffs of the formula

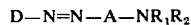

wherein D represents the radical of a diazo component, A represents an arylene radical, especially an optionally substituted 1,4-phenylene radical (which is preferably unsubstituted in the $m$-position to the azo group), and $R_1$ and $R_2$ each represent an optionally substituted alkyl group, at least one of the radicals D, A, $R_1$ and $R_2$ containing, bonded to an amino group, a fibre-reactive radical Z, Z representing a fluorinated triazinyl radical as defined above. Preferably the radical represented by A carries, in an orthoposition to the azo group, a group of the formula —$NR_4$—Z, wherein $R_4$ represents a hydrogen atom or an alkyl or aralkyl group and Z is as defined above. Of particular interest are the dyestuffs of the formula

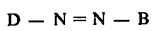

wherein D is thiazole, benzothiazole, pyridine, pyrazole, imidazole, thiadiazole, isothiazole or benzisothiazole, which is unsubstituted or substituted by a member selected from the group consisting of nitro, cyano, methyl, methylsulfonyl, bromine, acetylamino, phenyl, chlorine, methoxy, ethoxy, thiocyano, and carbethoxy, and B is a member selected from the group consisting of

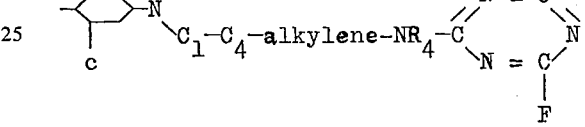

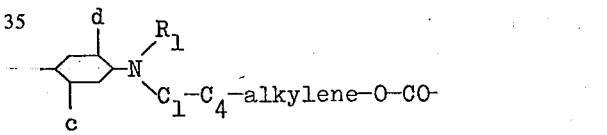

and

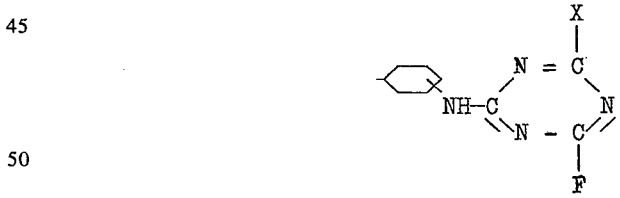

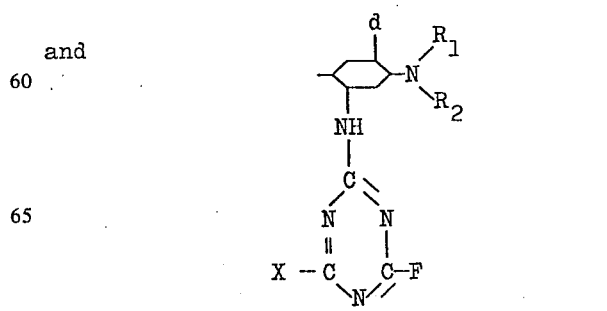

wherein c and d each are hydrogen, $C_1$–$C_4$-alkyl, $C_1$–$C_4$-alkoxy, phenylthio or phenoxy, and c in addition is chlorine, bromine, trifluoromethyl, —$CONH_2$, $C_1$–$C_4$-alkylcarbonylamino, benzoylamino, pyridine carbonylamino, thiophencarbonylamino, chloroacetylamino, methylsulfonylamino, ethylsulfonylamino, p-toluene-Sulfonylamino, $C_1$–$C_4$-alkoxycarbonylamino or phenoxycarbonyl-amino, $R_1$ and $R_2$ each are unsubstituted $C_1$–$C_4$-alkyl or $C_1$–$C_4$-alkyl substituted by halogen, hydroxy, phenyl, cyano, cyano-ethyoxy, $C_1$–$C_4$-alkoxy, $C_1$–$C_3$-alkoxycarbonyl, formylamino, acetylamino, $C_1$–$C_4$-alkylcarbonyloxy, $C_1$–$C_4$-alkylcarbamoyloxy, $C_1$–$C_3$-alkyloxycarbonyloxy, benzoyloxy, the above unsubstituted or substituted $C_1$–$C_4$-aklyl groups being optionally interrupted by an oxygen; $R_4$ is hydrogen or $C_1$–$C_4$-alkyl; and X is a halogen atom or a $C_1$–$C_2$-alkylamino, di-($C_1$–$C_2$-alkyl) amino, phenylamino, $C_1$–$C_2$-alkyl, $C_1$–$C_2$-alkoxy, phenoxy, methoxyethoxy, $C_1$–$C_2$-alkyl-mercapto or phenylmercapto group.

The diazo radical represented by D is preferably derived from a monocyclic or bicyclic amine of the formula $$D - NH_2$$

for example any desired deazotisable heterocyclic amine which does not contain any acid substituents which confer solubility in water, and is especially derived from an amine which comprises a heterocyclic five-membered ring containing 2 or 3 hetero-atoms, which five-membered ring preferably contains onee nitrogen atom and one or two other hetero atoms selected from sulphur, oxygen and nitrogen atoms, or from an aminobenzene, especially one of those of the general formula

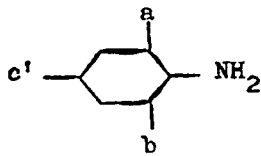

wherein a denotes a hydrogen or halogen atom or an alkyl or alkoxy, phenoxy, nitro, cyano, carbalkoxy or alkylsulphonyl group, b denotes a hydrogen or halogen atom, or an alkyl, cyano or trifluoromethyl group and c' denotes a nitro, cyano, carbolkoxy, sulphonic acid amide or alkylsulphonyl group.

The amine of the formula D—$NH_2$ is, for example: 2-aminothiazole, 2-amino-5-nitrothiazole, 2-amino-5-methyl-sulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthizole), 2-amino-4-(4'-nitro)-phenylthiazole, 3-aminopyridine, 3-amino-quinoline, 3-aminopyrazole, 3-amino-1-phenylpyrazole, 3-aminoindazole, 3-amino-1,2,4-triazole, 5-(methyl-, ethyl-, phenyl- or benzyl-)-1,2,4-triazole, 3-amino-1-(4' -methoxy-phenyl)-pyrazole, 2-aminobenzthiazole, 2-amino-6-methylbenz-thiazole, 2-amino-6-methoxybenzthiazole, 2-amino-6-chloro-benzthiazole, 2-amino-6-cyanobenzthiazole, 2-amino-6-thiocyanobenzthiazole, 2-amino-6-nitrobenzthiazole, 2-amino-6-carbethoxybenzthiazole, 2-amino-(4- or 6-)methylsulphonyl-benzthiazole, 2-amino-1,3,4-thiadiazole, 2-amino-1,3,5-thia-diazole, 2-amino-4-phenyl- or -4-methyl-1,3,5-thiadiazole, 2-amino-5-phenyl-1,3,4-thiadiazole, 2-amino-3 nitro-5-methylsulphonylthiophene, 2-amino-3,5-bis-(methylsulphonyl)-thiophene, 5-amino-3-methyl-isothiazole, 2-amino-4-cyano-pyrazole, 2-(4'-nitrophenyl)-3-amino-4-cyanopyrazole, 3- or 4-aminophthalimide.

The aminobenzene is, for example: 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyano-benzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino 2-trifluoromethyl-4-chlorobenzene, 1-amino-2-cyano-4-chloro-benzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitro-benzene, 1-amino-2-chloro-4-carbethoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene or especially 1-amino-2-cyano-4 -nitrobenzene, a 1-aminobenzene-2-, -3-or 4-sulphonic acid amide, for example the N-methylamide or N,N-dimethylamide or N,N-diethylamide, N,γ-isopropoxypropyl-2-amino-naphthalene-6-sulphonic acid amide, N,γ-isoporpoxy-propyl-1-aminobenzene-2-, -3- or -4-sulphonic acid amide N-isopropyl-1-aminobenzene-2-, -3- or -4-sulphonic acid amide, N,γ-methoxypropyl-1-aminobenzene-2-, -3- or -4-sulphonic acid amide, N,N-bis(β-hydroxyethyl)-1-aminobenzene-2-, -3-or -4-sulphonic acid amide, 1-amino-4-chlorobenzene-2-sulphonic acid amide, or an N-substituted derivative, 2-3- or 4-aminophenylsulphamate, 2-amino-4-, -5- or -6-methyl-phenylsulphamate, 2-amino-5-methoxy-phenylsulphamate, 3-amino-6-chlorophenylsulphamate, 3-amino-2,6-dichlorophenylsulphamate, 4-amino-2- or -3-methoxyphenylsulphamate, N,N-dimethyl-2-aminophenylsulphamate, N,N-di-n-butyl-2-amino-phenylsulphamate, N,N-dimethyl- 2-amino-4-chlorophenyl-sulphamate, N,n-propyl-2-aminophenylsulphamate, N,N-di-n-butyl-3-aminophenylsulphonate, 0(3-aminophenyl)-N-morpholine-N-sulphonate, 0(3-aminophenyl)-N-piperidine-sulphonate, N-cyclohexyl-0-(3-aminophenyl)-sulphamate, N(N-meethylaniline)-0-(3-aminophenyl)-sulphonate, N,N-diethyl-3-amino-6-methyl-phenyl-sulphamate, N-ethylemeimine-0-(4-aminophenyl)-sulphonate, N,N-dimethyl-4-aminophenylsulphamate, 0(n-propyl)-0(3-aminophenyl)sulphonate, 0, β-chlorethyl-0(2-aminophenyl)-sulphonate, 0-benzyl-0(3-aminophenyl)-sulphonate and 0-ethyl-0(4-amino-2,6-dimethyl-phenyl)sulphonate.

4-Aminoazobenzenes which can be used as diazo components are, for example, 4-aminoazobenzene, 4-amino-2-nitroazobenzene, 3,2'-dimethyl-4-aminoazobenzene, 2-methyl-5-methoxy-4-aminoazobenzene, 2,5-dimethoxy-4-aminoazobenzen, 4'-methoxy-4-aminoazobenzene, 2-methyl-4'-methoxy-4-aminoazo-benzene, 3,6,4'-trimethoxy-4-aminoazobenzene, 4'-chlor-4-aminoazo-benzene, 2'- or 3'-chlor-4-aminoazobenzene, 3-nitro-4-amino-2', 4'-dichlorazobenzene and 4-aminoazobenzene-4'-sulphonic acid amide.

The radical represented by A is preferably a radical of formula

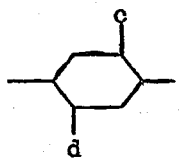

wherein c and d are substituents selected from hydrogen atoms, lower alkyl, for example methyl or ethyl, radicals, lower alkoxy, for example methoxy or ethoxy, radicals, and phenylthio and phenoxy raidcals.

The group or atom represented by c is preferably bonded in the ortho-position to the azo group and in addition to the above-mentioned groups and atoms may be a chlorine or bromine atom, a trifluoromethyl group, a $CONH_2$ group, the radical Z, an alkylsulphonyl, preferably a methylsulphonyl, group, or an acylamino group which is optionally alkylated, preferably methylated, at the nitrogen atom, and in which the acyl radical is the radical of an organic monocarboxylic acid, for example acetic, chloroacetic, butyric, benzoic, pyridinecarboxylic or thiophenecarboxylic acid, the radical of an organic monosulphonic acid, for example methane-, ethane- or p-toluene-monosulphonic acid, or the radical of a carbamic acid or of a carbonic acid monoester, for example phenoxycarbonyl, methoxycarbonyl or butoxycarbonyl radicals.

The symbols $R_1$ and $R_2$ may represent hydrogen atoms or lower alkyl groups, that is to say alkyl groups containing 1 to 4, preferably 2 to 4, carbon atoms, for example methyl, ethyl, n-propyl or n-butyl groups, which can be substituted in the customary manner or interrupted by hetero-atoms, preferably oxygen atoms. Examples of groups which $R_1$ and $R_2$ may represent are, for example, benzyl groups, β-phenylethyl groups, halogenated alkyl groups, for example β-chlorethyl, β, β, β-trifluorethyl or β, γ-dichloropropyl groups, β-cyano-ethyl groups, cyanoalkoxyalkyl groups, for example β-cyano-ethoxy-ethyl groups, alkoxyalkyl groups, for example β-ethoxyethyl, δ-methoxybutyl or δ-butoxyby-tyl groups, hydroxyalkyl groups, for example β-hydroxyethyl or β,γ-dihydroxypropyl groups, nitro-alkyl groups, for example β-nitroethyl groups, carbalkoxy groups, for example 62 -carbo-(methoxy-, ethoxy- or porpoxy)-ethyl groups, (wherein the terminal alkyl group may carry cyano, carbalkoxy, acyloxy and amino groups in the ω-position) or β- or γ-carbo-(methoxy or ethoxy)-propyl groups, acylaminoalkyl groups, for example β-(acetyl- or formyl)-aminoethyl groups, acyloxyalkyl groups, for example β-acetoxyethyl, β,γ-diacetoxypropyl, β-propionyloxyethyl or β-butyryloxyethyl groups, β-(alkyl- or aryl)-sulphonylalkyl groups, for example β-methanesulphonylethyl, β-ethanesulphonylethyl or β-(p-chlorobenzenesulphonyl)-ethyl groups, alkyl- or aryl-carbamoylozyalkyl groups, for example β-methyl-carbamyloxy-ethyl or β-phenyl-carbamyloxyethyl groups, alkyloxycarbonyloxyalkyl groups, for example β-(methoxy-, ethoxy- or isopropoxy)-carbonyloxyethyl groups, γ-acetamido-propyl groups, β-(p-nitrophenoxy)-ethyl groups, β-(p-hydroxyphenoxy)-ethyl groups, β-(β'-acetylethoxycarbonyl)-ethyl groups, β-[β'-(cyano-, hydroxy-, methoxy- or acetoxy-)ethoxycarbonyl]-ethyl groups, β-carboxyethyl groups, β-acetylethyl groups, β-cyanoacetoxyethyl groups, β-benzoyl groups, and β-(p-alkoxy-or phenoxy-benzoyl)-oxyethyl groups.

Preferably, $R_1$ and/or $R_2$ denote a radical of formula

—alkylene—$NR_4$—Z, wherein Z is as defined above and $R_4$ represents a hydrogen atom or an alkyl group which preferably contains at most 4 carbon atoms.

The groups represented by $R_1$ and $R_2$ generally should not contain more than 18 carbon atoms.

As disazo dyestuffs there may, for example, be mentioned those in which two identical or different molecules of monoazo dyestuffs of the general formula

D—N=N—A' wherein D is an defined above and A' represents the radical of a coupling component, preferably a radical of the formula A—$NR_1R_2$, are bonded to one another via their coupling components by a divalent bridge Z', which is devoid of any dyestuff character, with either one of the dyestuff radicals or the bridge Z' carrying a radical of formula —$NR_4$—Z.

Styryl Dyestuffs

Preferred styryl dyestuffs are those of the general formula

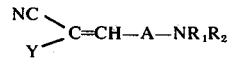

wherein A, $R_1$ and $R_2$ are as defined above and Y represents a cyano, carbonamido, carbalkoxy or arylsulphonyl group, for example a carbethoxy or an N-alkylcarbon-amido, N-arylcarbonamido, or N,N-dialkylcarbonamido or a phenyl-sulphonyl group, and wherein at least one of the radicals $R_1$, $R_2$ or Y must contain the radical —$NR_4$—Z.

Especially preferred are dyestuffs of the formulae

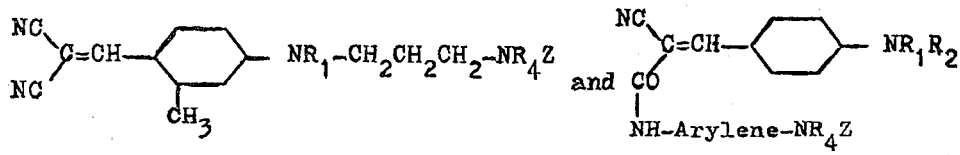

wherein the radicals $R_1$, $R_2$, $R_4$ and Z are as defined above.

Preferred bis-styryl dyestuffs are those in which two monostyryl dyestuff molecules of the formula

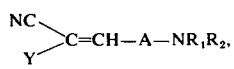

which may be identical or different, and wherein Y, $R_1$, $R_2$ and A are as defined above, are bonded to one another via the radical A or $R_1$ by a divalent bridge Z', which is devoid of any dyestuff character, with at least one of the radicals $R_1$, $R_2$, A or Z' carrying a fibre-reactive radical Z.

Anthraquinonoid Dyestuffs

Dyestuffs of the anthraquinone series according to the invention are, for example, anthraquinone derivatives of the formula

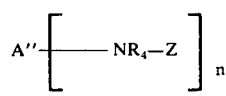

wherein $n$ is 2 or preferably 1, $R_4$ and Z are as defined above, and A'' denotes an anthraquinone radical having 3 or 5 condensed rings, which contains one or more other substituents selected from, for example, halogen atoms, for example fluorine, chlorine or bromine atoms, hydroxyl groups, alkoxy groups, amino groups, acylamino groups alkylamino groups containing 1 to 3 carbon atoms, acyloxy groups, for example aryl-sulphonyloxy groups, especially p-toluenesulphonyloxy groups, optionally substituted aryl radicals, optionally substituted heterocyclic radicals, arylamino groups, wherein the aryl radical is preferably a phenyl group which may be substituted by one or more halogen atoms, alkyl groups or alkoxy groups, alkyl- or optionally substituted phenyl-sulphonyl groups, alkyl- or optionally substituted phenyl-thioether radicals, nitro groups, cyano groups, carbonic acid ester groups and acetyl groups. Examples of tetracyclic anthraquinone radicals are 1,9-isothiazolanthrone, 1,9-anthrapyrimidine and 1,9-pyrazolanthrone. The alkyl radicals preferably contain up to 6 carbon atoms.

The present invention also provides a process for the manufacture of the dyestuffs of the invention which comprises either a) reacting a dyestuff which contains at least one acylatable group of formula —$NHR_4$, wherein $R_4$ is as defined above, with at least one fibre-reactive acylating agent of the formula Z—F, or b) linking 2 components, at least one of which contains at least one group Z bonded to an amino group, by condensation or coupling to give a dyestuff which contains at least one group Z, wherein Z in each case is as defined above.

I. Process Variant (a)

A. Fibre-reactive Acylating Agents

The fibre-reactive acylating agents used to introduce the radical Z are fluorinated nitrogen-containing heterocyclic compounds, preferably triazines, for example trifluorotriazine, difluorochlorotriazine or a mixture of the two.

The difluorotriazines which still contain an alkyl, aryl, amino, alkoxy, aryloxy or thioether group are most conveniently obtained from the corresponding dichlorotriazines which are converted by means of a fluoride, for example potassium hydrogen fluoride, without or with a solvent, for example sulpholane or nitrobenzene, into the fluorine derivatives.

Suitable difluorotriazines are, for example, 2-ethyl-4,6-difluoro-triazine, 2-ethoxy-4,6-difluorotriazine, 2-phenyl-4,6-difluorotriazine and 2-ethylthio-4,6-difluoro-triazine.

B. Dyestuff Components:

The following dyestuffs are for example suitable for use as a reactive component:

1. Azo Dyestuffs

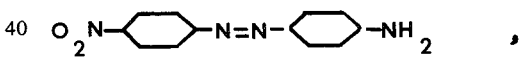

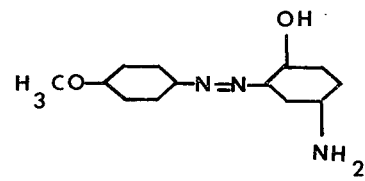

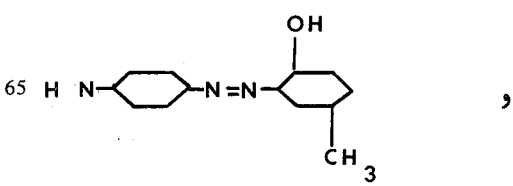

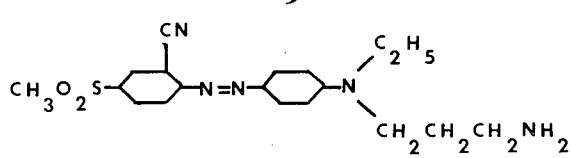

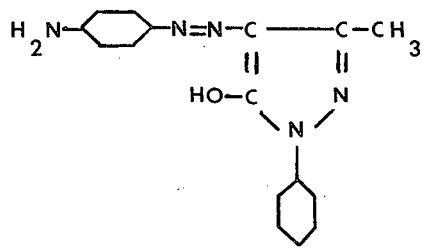

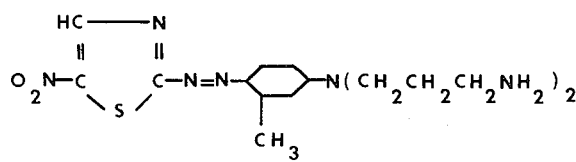

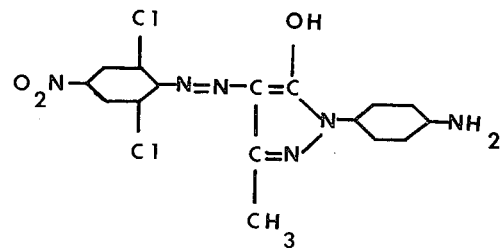

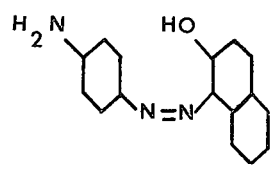

2. Anthraquinone Dyestuffs
1,4-Diaminoanthraquinone, 1-amino-4-hydroxyanthra-quinone, 1,4-bis-(p-amino-anilino)-5-hydroxyanthraquinone, 1,4-bis-(p-amino-anilino)-5,8-dihydroxyanthraquinone, 1,4-bis-(p-amino-anilino)-2-methylanthraquinone, 1,5-bis-(p-amino-anilino)-4,8-dihydroxyanthraquinone, 1-hydroxy-4-(p-amino-anilino)-anthraquinone, 5-amino-1,9-isothiazolanthrone, 4-amino-1,9-anthrapyrimidine, 5-amino-1,9-anthrapyrimidine, 2- or 3-aminobenzanthrone and 5- or 8-amino-1,9-pyrazolanthrone.

3. Nitro Dyestuffs

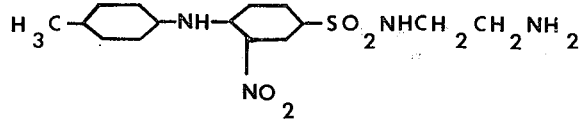

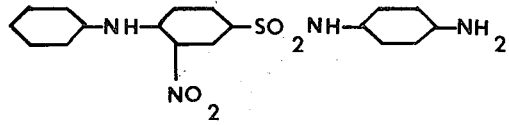

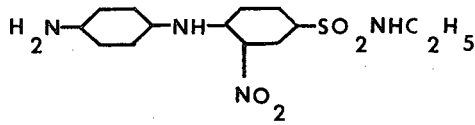

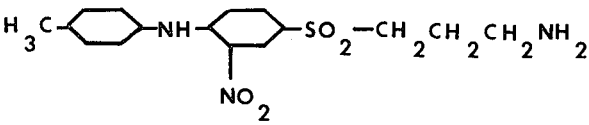

4. Styryl Dyestuffs

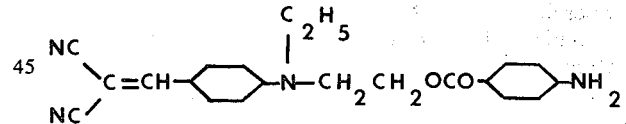

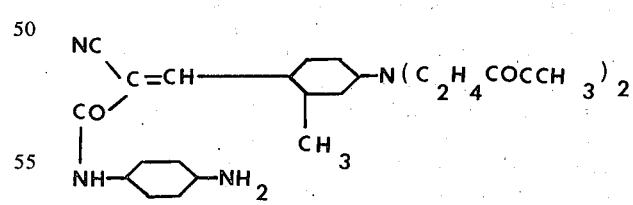

5. Quinophthanone Dyestuffs:

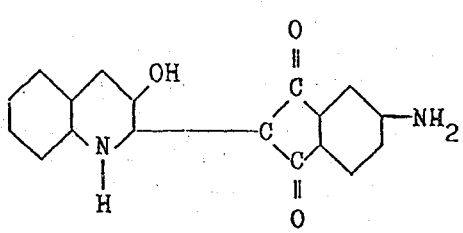

6. Pyridone Dyestuffs:

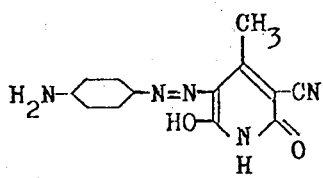

7. Perinone Dyestuffs:
Mixtures of the dyestuffs of formula

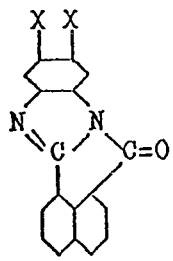

or mixtures of the dyestuffs of formula

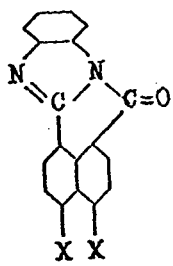

wherein, in each case, one X represents a group of formula —NH₂ and the other X represents a hydrogen atom.

C. Reaction Conditions

The reaction with the acylating agent is normally carried out by adding the acid halide to the amine to be acylated, the process in most cases being carried out in an organic solvent, for example methylene chloride, chloroform, carbon tetrachloride, benzene, a chlorinated benzene, a chlorinated higher aromatic hydrocarbon, diisopropyl ether, dioxane, acetonitrile, glacial acetic acid or 80 % strength acetic acid, or in an acid aqueous solution, or using a suspension of the dyestuff to be acylated.

II. Process Variant (b)

A. Azo Dyestuffs (coupling)

The azo dyestuffs according to the invention may, for example, be obtained by coupling a diazonium compound of an amine with a coupling component, with at least one of the components, preferably the coupling component, containing a fibre-reactive group Z.

The above-mentioned diazo components of the formula D—NH₂ can be used as diazo components which do not contain a fibre-reactive group Z.

Suitable coupling components which contain a fibrereactive group Z may be obtained by reaction of one of the following components with an acid halide of formula Z-Hal: 3-amino-N,N-bis-$\beta,\beta$-acetoxyethyl-aniline, 3-amino-N,N-bis$\beta$, $\beta$-cyanethyl-aniline, 3-amino-N,N-bis-methyl-aniline, N,$\delta$-aminopropyl-N-ethyl-aniline and 3-amino-N,N-bis-ethyl-aniline.

The diazotisation of the diazo components mentioned can be carried out according to methods which are known per se, for example with the aid of a mineral acid and sodium nitrite or with a solution of nitrosylsulphuric acid in concentrated sulphuric acid.

The coupling can also be carried out according to methods which are known per se, for example in a neutral to acid medium, optionally in the presence of sodium acetate or a similar buffer substance or a catalyst which influences the coupling speed, for example dimethylformamide, pyridine or one of its salts.

The term "known per se" is to be understood as designating methods in actual use or described in the literature on the subject.

The coupling is advantageously carried out by combining the components in a mixing nozzle. By this there is to be understood a device in which the liquids to be mixed are combined with one another in a relatively small space, with at least one of the liquids, preferably under pressure, being passed through a nozzle. The mixing nozzle can, for example, be constructed and operated in accordance with the principle of the waterpump, the infeed of one liquid into the mixing nozzle corresponding to the water infeed into the waterpump and the infeed of the other liquid into the mixing nozzle corresponding to the connection of the waterpump to the vessel to be evacuated, this latter liquid infeed possibly also being under pressure.

III. Use

The water-insoluble dyestuffs according to the invention, their mixtures with one another and their mixtures with other azo dyestuffs are outstandingly suitable for dyeing and printing leather, wool, silk, cotton, regenerated cellulose and especially synthetic fibres, for example acrylic or acrylonitrile fibres, polyacrylonitrile fibres and fibres comprising copolymers of acrylonitrile and other vinyl compounds, for example acrylic esters, acrylamides, vinylpyridine, vinyl chloride or vinylidene chloride, copolymers of dicyanoethylene and vinyl acetate, acrylonitrile block copolymers poly-urethanes, basic-modified polyolefines, for example polypropylene, cellulose triacetate or cellulose 2½-acetate and especially fibres comprising polyamides, for example nylon-6, nylon-6.6 or nylon 12, aromatic polyesters, for example those from terephthalic acid and ethylene glycol or 1,4-dimethylcyclo-hexane, or copolymers of terephthalic and isophthalic acids and ethylene glycol.

For dyeing in aqueous liquors, the water-insoluble dyestuffs are appropriately used in a finely divided form and dyeing is preferably carried out with the addition of dispersing agents, for example sulphite cellulose waste lye or synthetic detergents, or of a combination of different wetting agents and dispersing agents. Generally it is advisable to convert the dyestuff to be used, before dyeing, into a dyeing preparation which contains a dispersing agent and a finely divided dyestuff in such a form that on dilution of the dyestuff preparation with water a fine dispersion results. Such dyestuff preparations can be obtained in a known manner, for example by grinding the dyestuff in a dry or wet form, with or without addition of dispersing agents during the grinding process.

The dyestuffs according to the invention dye fibres containing hydroxyl, amino and/or amide groups, especially polyamide fibres, in a weakly alkaline, neutral or weakly acid bath, for example in a bath containing acetic acid. It should be mentioned as a particular advantage of the dyestuffs according to the invention that they dye nylon fibres satisfactorily over a very broad pH range, from acid to alkaline pH-values. This is also true for wool.

The dyeings and prints obtained on polyamide fibres and wool with these dyestuffs show excellent wet fastness properties, especially good fastness to light, washing, perspiration, fulling and water.

In order to achieve strong dyeings on polyethylene terephthalate fibres it is preferably to add a swelling agent to the dyebath, or to carry out the dyeing process under pressure at a temperature above 100°C, for example at 120°C. Suitable swelling agents are aromatic carboxylic acids, for example salicylic acid, phenols, for example o- or p-hydroxy-diphenyl, aromatic halogen compounds, for example o-dichloro-benzene, or diphenyl.

For heat-fixing the dyestuff, the padded polyester fabric is heated, preferably after prior drying, for example in a warm stream of air, to a temperature above 100°C, for example between 180° and 210°C.

The dyeings obtained according to the present process can be subjected to an after-treatment, for example heating them with an aqueous solution of a non-ionic detergent.

Instead of by impregnation, the dyestuff indicated can, according to the present process, also be applied by printing. For this purpose a printing ink is used which, for example, contains, in addition to the finely dispersed dyestuff, auxiliary agents which are customary in the printing industry, for example wetting agents and thickeners.

Strong dyeings and prints having good fastness properties are obtained according to the present process.

Instead of aqueous dyeing liquors, organic dyeing liquors can also be used. For exhaustive dyeing, liquors of chlorinated aliphatic hydrocarbons, for example trichlor ethylene or tetrachlorethylene, can be used, and these may contain solubilising agents, for example dimethylformamide. For dyeing by padding, mixtures of chlorinated aliphatic hydrocarbons and solubilising agents can again be used. It is also possible to use emulsions which, for example, contain 1 to 10% of water and 99 to 90% of tetrachlorethylene.

The water-insoluble dyestuffs according to the invention can also be used for the spin dyeing of polyamides, polyesters and polyolefines. The polymer to be dyed is appropriately mixed, in the form of powder, granules or chips, as a ready-to-use spinning solution or in the fused state, with the dyestuff, which is introduced in the dry state or in the form of a dispersion or solution in an optionally volatile solvent. After the homogeneous distribution of the dyestuff in the solution or melt of the polymer, the mixture is processed in a known manner, by casting, pressing or extrusion, to give, for example, fibres, yarns, monofilaments or films.

The following Preparations and Examples illustrate the invention, the parts, unless otherwise stated, denoting parts by weight, and the percentages denoting percentages by weight.

Preparation I

N-Bis-β-cyanoethyl-3-(α'β'-dibromopropionyl)-amino-aniline 5.3 parts of N-bis-β-cyanoethyl-3-amino-aniline are dissolved in acetone, reacted with a small excess of difluoro-chlorotriazine, and the mixture stirred fro some time. A product of the formula

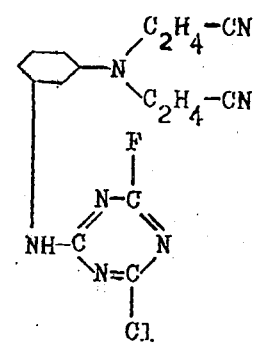

is obtained.

Preparation II

N-Bis-β-acetoxyethyl-3-(α', β'-dibromopropionyl)-amino-aniline 14 parts of N-bis-acetoxyethyl-3-amino-aniline are dissolved in acetone. A small excess of trifluorotriazine is added and the solution is stirred for some time. After determining the coupling titre, the product of the formula

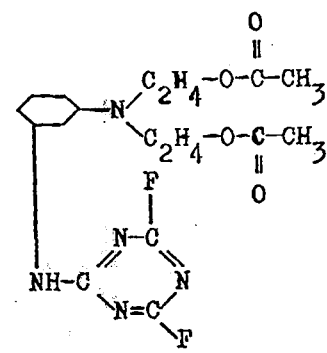

can be used without further purification.

The following coupling components may be manufactured analogously:

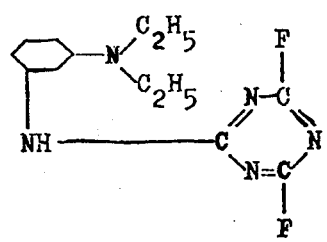

and 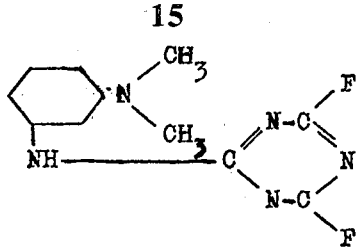

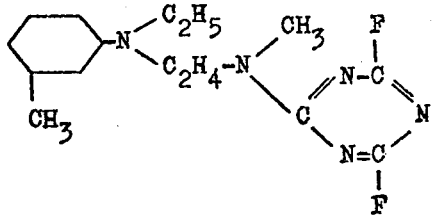

Preparation III 9.7 parts of N-β-hydroxyethyl-N-δ-aminopropylaniline are dissolved in acetone. A slight excess of trifluorotriazine is added and the solution is stirred for some time. After determining the coupling titre, the product of the formula

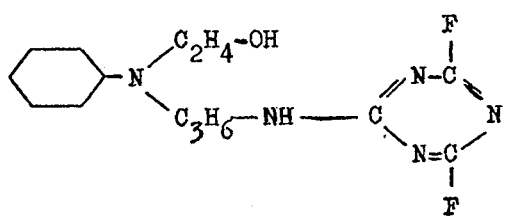

Preparation IV 24.8 parts of 5-nitro-isophthalic acid chloride are dissolved in chlorobenzene. A solution of 35.8 parts of N-ethyl-N-hydroxyethyl-m-toluidine in chlorobenzene is added dropwise thereto and the mixture is then stirred for some time at 100°C. The hot solution is then poured into dilute sodium hydroxide solution. The precipitate is stirred for a short time and the chlorobenzene is then removed by steam distillation. The aqueous phase is separated off, whilst the sticky product is taken up in chloroform. The remaining water is separated off and the chloroform is distilled off. A product of the formula

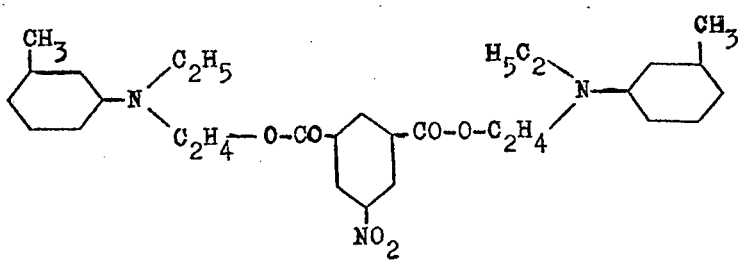

can be used without further purification. The following coupling components may be manufactured analogously:

is obtained.

10.6 parts of the product obtained above are suspended in ethyl alcohol and hydrogenated using palladium-on-charcoal as a catalyst. Thereafter the alcohol is distilled off and the resulting oil is left to stand for a prolonged period at room temperature, whereupon it crystallises. A product of the formula

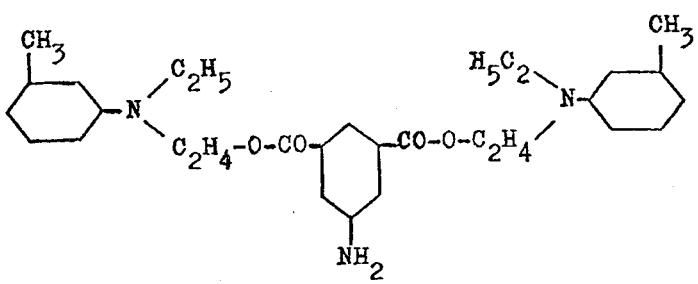

is obtained.

11.9 parts of the amine obtained above are dissolved in acetone at room temperature. A slight excess of trifluorotriazine is then added and the mixture is stirred overnight at room temperature. After determining the coupling titre, the product of the formula

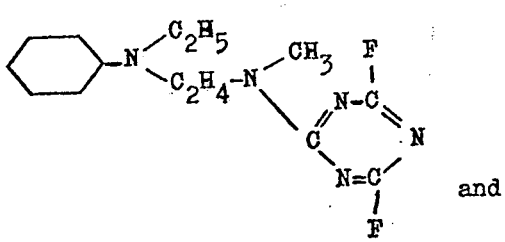 and

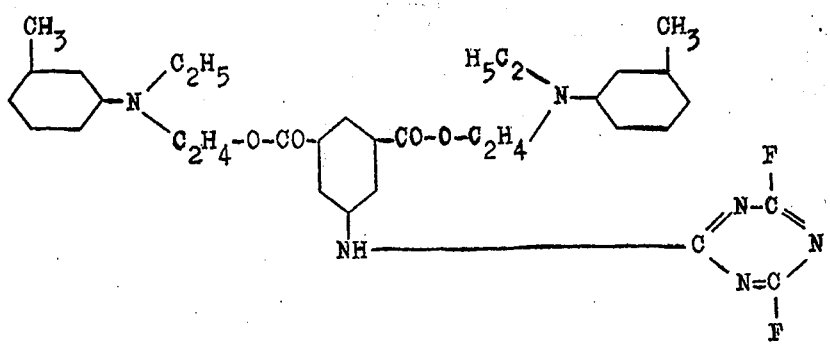

Preparation V 161 parts of p-nitrobenzoyl chloride (95.1% strength) are suspended in chlorobenzene and warmed to 80°C. A solution of 147.4 parts of N-ethyl-N-β-hydroxyethyl-m-toluidine in chlorobenzene is added dropwise thereto. Thereafter the reaction mixture is stirred for some time and then poured into a dilute sodium hydroxide solution and the mixture stirred for some time, in the course of which the initially strongly alkaline solution becomes acid. The mixture is adjusted to a pH-value of 7 with sodium hydroxide solution, the chlorobenzene is removed by steam distillation and the aqueous residue is allowed to cool, whereupon the product crystallises out. The mixture is filtered and the residue well washed with water and dried. The resulting product is suspended in ethanol and hydrogenated using palladium-on-charcoal as a catalyst. Thereafter the suspension is heated to the boil and filtered hot, and the filtrate is concentrated. The product which precipitates is filtered off and washed with ethanol. After drying in vacuo, a product of the formula

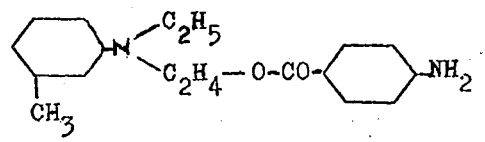

is obtained.

14.9 parts of this product are dissolved in acetone. A slight excess of trifluorotriazine is added thereto and the solution is stirred for some time. A product of the formula

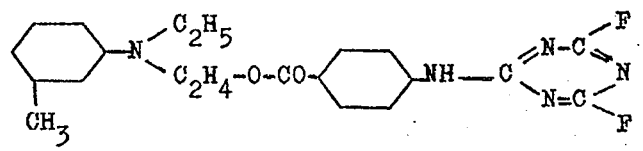

is obtained. After determination of the coupling titre, the product can be used directly.

The coupling component of the formula

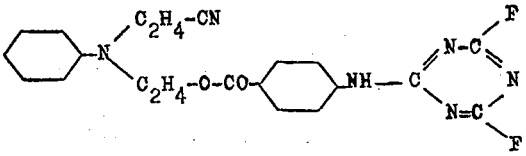

may be manufactured in a similar manner.

EXAMPLE 1

3.1 parts of 2-cyano-4-chloraniline are introduced into 20 parts by volume of 2 N hydrochloric acid. The mixture is diazotised with 4 N sodium nitrite solution at a temperature of 0° to 5°C and stirred for some time. Thereafter the excess nitrite is destroyed with urea.

This solution is added dropwise, at a temperature of at most 10°C, to a solution of 7.9 parts of N-bis-β-acetoxy-ethyl-3-(difluorotriazinyl)-amino-aniline in 125 parts of acetone, the mixture is stirred overnight at 0° to 10°C, and the dyestuff is precipitated by adding ice water. The mixture is filtered and the dyestuff is washed until neutral and dried in vacuo. A dyestuff of the formula

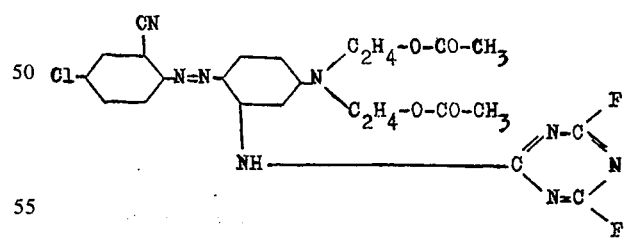

which dyes nylon fibres yellowish-tinged red shades having excellent wash fastness, is obtained.

EXAMPLE 2

If, instead of the above-mentioned N-bis-β-acetoxy-ethyl-3-(difluorotriazinyl)-amino-aniline, 6.6 parts of N-bis-β-cyanoethyl-3-(difluorotriazinyl)-amino-aniline are used, a dyestuff of the formula

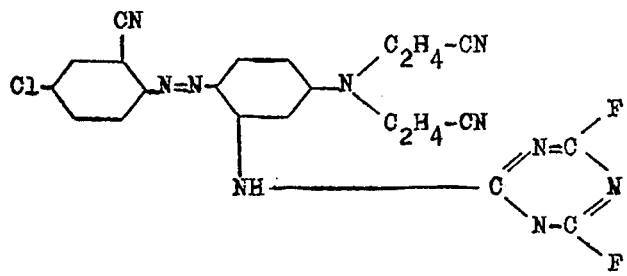

which dyes wool fibres orange-red shades, is obtained.

If the diazo compounds of the amines mentioned in column I are coupled with the coupling component indicated in column II under the conditions described in Example 1, reactive dispersion dyestuffs are obtained which dye polyamide fibres the shade indicated in column III, unless a different type of fibre is indicated.

| No. | I | II | III |
|---|---|---|---|
| 1 | 2-Amino-6-ethoxy-benzthiazole | 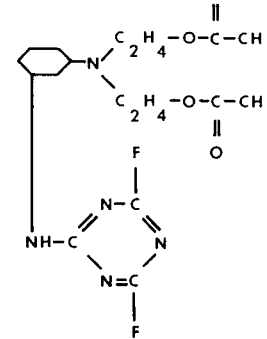 | reddish-tinged violet |
| 2 | 2-Amino-5-nitro-thiazole | 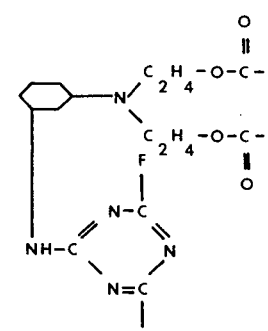 | blue |
| 3 | 4-Nitroaniline | 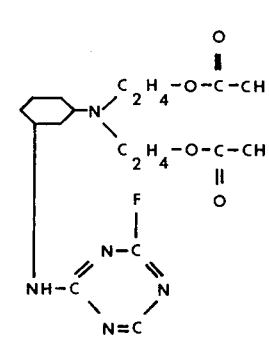 | red |

| No. | I | II | III |
|---|---|---|---|
| 4 | 2-Cyano-4-nitroaniline | 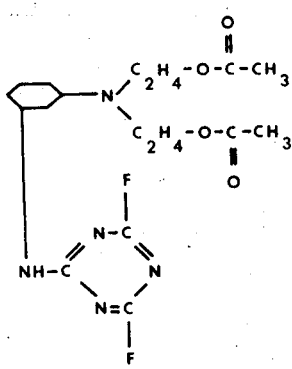 | violet |
| 5 | 2-Trifluoromethyl-4-chloraniline | 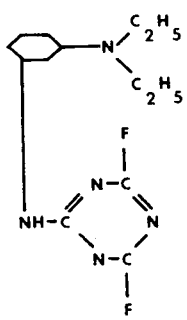 | red |
| 6 | 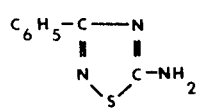 | 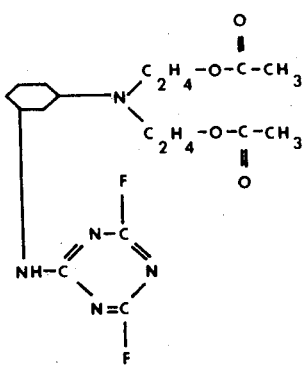 | red |
| 7 | 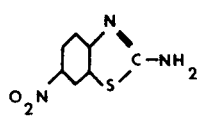 | 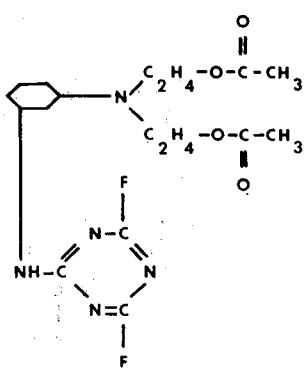 | violet |

| No. | I | II | III |
|---|---|---|---|

Table continues with entries 8–12, showing chemical structures with colors:

- 8: red
- 9: orange-red
- 10: violet (on polyester)
- 11: red
- 12: red

—Continued
| No. | I | II | III |
|---|---|---|---|
| 13 | 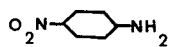 | | red |
| 14 | 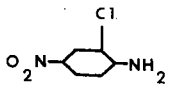 | 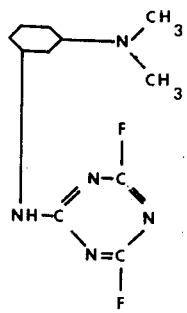 | reddish-tinged violet |
| 15 | 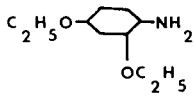 | 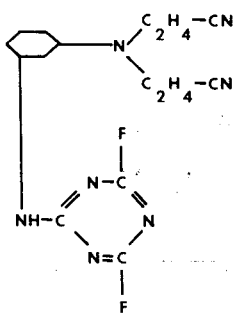 | orange-yellow |
| 16 | 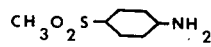 | 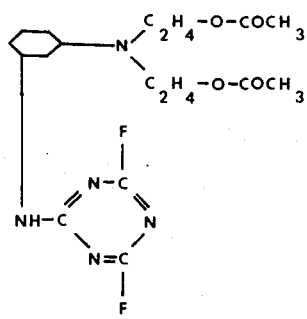 | orange |
| 17 | 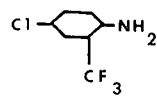 | 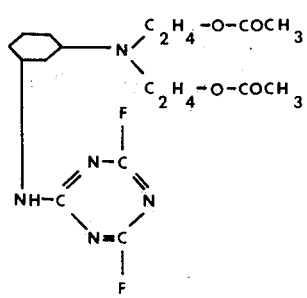 | red-orange |

| No. | I | II | III |
|---|---|---|---|
| 18 | (Cl, CF$_3$, NH$_2$ substituted ring) | Ring-N(C$_2$H$_4$-CN)$_2$ with triazine bearing two F and NH- | orange |
| 19 | (COOCH$_3$, NH$_2$, COOCH$_3$ substituted ring) | Ring-N(C$_2$H$_4$-O-COCH$_3$)$_2$ with triazine bearing two F and NH- | orange-red |
| 20 | | Ring-N(C$_2$H$_4$-CN)$_2$ with triazine bearing two F and NH- | golden yellow |
| 21 | (CH$_3$O$_2$S, Cl, NH$_2$ substituted ring) | Ring(CH$_3$)-N(C$_2$H$_5$)(C$_2$H$_4$-O-CO-ring-NH-triazine with two F) | orange-red |
| 22 | (CH$_3$O$_2$S, Cl, NH$_2$ substituted ring) | Ring-N(C$_2$H$_4$CN)(C$_2$H$_4$-O-CO-ring-NH-triazine with two F) | orange |

-Continued

| No. | I | II | III |
|---|---|---|---|
| 23 | (nitro-cyano-cyclohexyl-amine structure) | cyclohexyl-N(C₂H₄-OH)(C₃H₆-NH-) linked to difluoro-triazine | violet |
| 24 | CH₃O₂S— and Cl substituted cyclohexyl-amine | cyclohexyl-N(C₂H₄-OH)(C₃H₆-NH-) linked to chloro-fluoro-triazine | orange |
| 25 | O₂N—C₆H₄—NH₂ | cyclohexyl-N(C₂H₄-OH)(C₃H₆-NH-) linked to chloro-fluoro-triazine | orange |
| 26 | NC— with OCH₃ groups cyclohexyl-amine | cyclohexyl-N(C₂H₄-CN)(C₂H₄-CN) with NH linked to chloro-fluoro-triazine | scarlet |
| 27 | NC— with OCH₃ groups cyclohexyl-amine | cyclohexyl-N(C₂H₅)(C₂H₄-O-CO-C₆H₄-NH-) linked to difluoro-triazine | scarlet |
| 28 | O₂N—, O-C₆H₄-Cl(-o), NH₂ substituted cyclohexyl | cyclohexyl-N(C₂H₄-O-CO-CH₃)(C₂H₄-O-CO-CH₃) linked to difluoro-triazine | bluish-tinged red (on polyester) |

| No. | I | II | III |
|---|---|---|---|
| 29 |  | 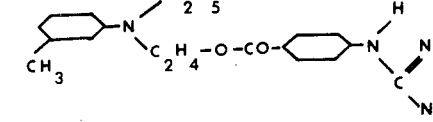 | red (on polyester) |
| 30 |  | 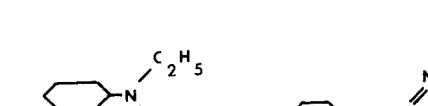 | bluish-tinged red |
| 31 |  | 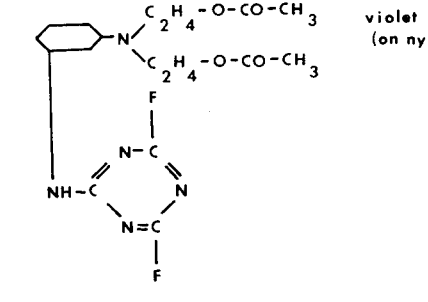 | violet (on nylon) |
| 32 |  | 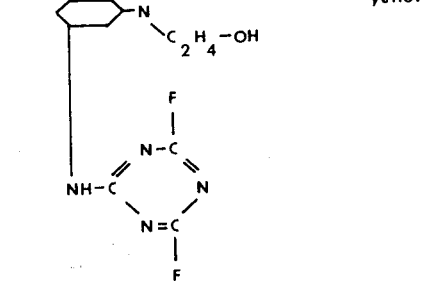 | yellow-orange |
| 33 |  | | orange-red |
| 34 |  | 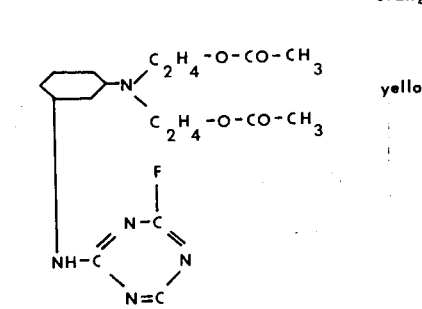 | yellow-orange |

-Continued

| No. | I | II | III |
|-----|---|----|-----|
| 35 | 2-amino-4-chloro-benzonitrile | phenyl-N(C₂H₄-O-CO-CH₃)₂ linked via NH to triazine bearing Cl and F | yellowish-tinged red |
| 36 | 2-amino-4-chloro-benzonitrile | phenyl-N(C₂H₄-CN)₂ linked via NH to triazine bearing F and Cl | orange-red |
| 37 | 2-chloro-4-methylsulfonyl-aniline (CH₃O₂S–C₆H₃(Cl)–NH₂) | | orange |
| 38 | 2-chloro-4-methylsulfonyl-aniline (CH₃O₂S–C₆H₃(Cl)–NH₂) | phenyl-N(C₂H₄-O-CO-CH₃)₂ linked via NH to triazine bearing Cl and F | yellowish-tinged red |
| 39 | 4-Nitroaniline | phenyl–N(CH₂CH₂–CO–O–CH₃)₂ linked via NH to triazine bearing two F | red |

| No. | I | II | III |
|---|---|---|---|

40 — 2-Chloro-4-nitro-aniline — [structure with N(C₂H₄-C(=O)-O-C₂H₅)₂ and difluorotriazine NH linkage] — bluish-tinged red 41 — 2-Cyano-4-chlor-aniline — [structure with N(C₂H₄-O-C(=O)-NH-C₂H₅)₂ and difluorotriazine NH linkage] — yellowish-tinged red 42 — 2-Chloro-4-nitro-aniline — [structure with N(C₂H₄-O-C₂H₄-CN)(C₂H₄-O-C(=O)-phenyl-NH-) linked to difluorotriazine] — bluish-tinged red 43 — 2-Chloro-4-methyl sulphonyl-aniline — [structure with N(C₂H₄-O-CH₃)(C₂H₄-O-C(=O)-phenyl-NH-) linked to difluorotriazine]

44 — 2-Chloro-4-methyl-sulphonyl-aniline — [structure with N(CH₂-CH₂-O-C(=O)-O-C₂H₅)₂ and difluorotriazine NH linkage] — orange (on wool)

| No. | I | II | III |
|---|---|---|---|
| 45 | 2-Cyano-4-chloro-aniline | 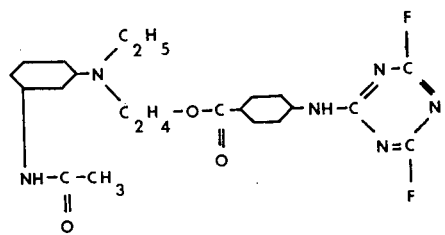 | yellowish-tinged red |
| 46 | 2-Cyano-4-chloro-aniline | 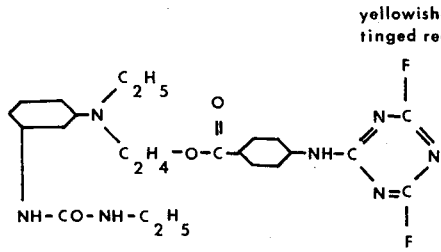 | yellowish-tinged red |
| 47 | | 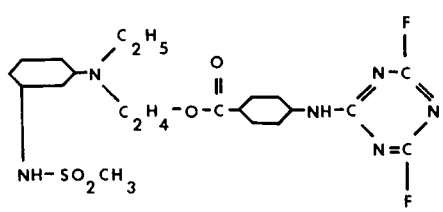 | |
| 48 | 4-Nitroaniline | 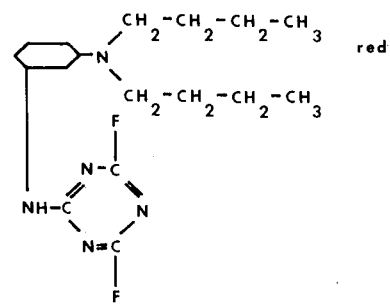 | red |
| 49 | 2-Cyano-4-nitro-aniline | 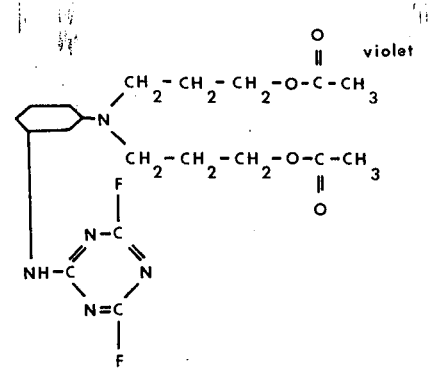 | violet |

-Continued
| No. | I | II | III |
|---|---|---|---|
| 50 | 2-Cyano-4-chloraniline | 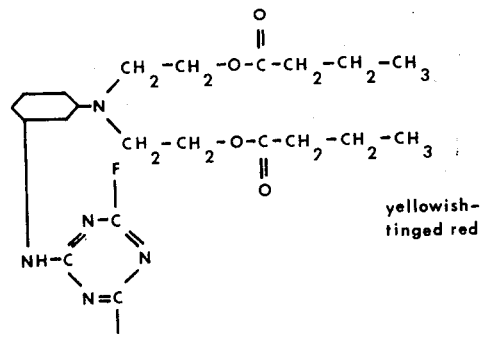 | yellowish-tinged red |
| 51 | 2-Cyano-4-chloraniline | 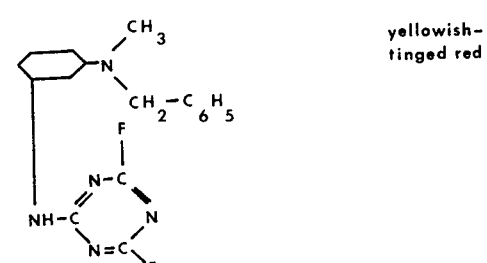 | yellowish-tinged red |
| 52 | 2-Chloro-4-nitroaniline | 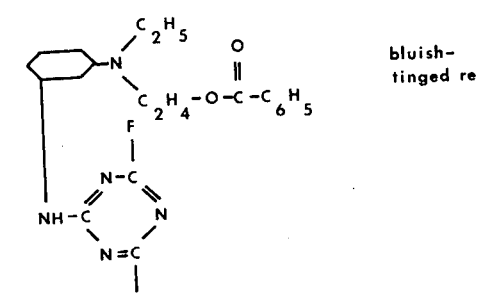 | bluish-tinged red |
| 53 | 2-Trifluoromethyl-4-chloraniline | 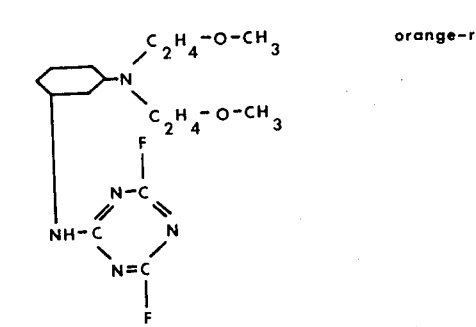 | orange-red |
| 54 | 2,5-Dimethoxy-4-cyananiline | 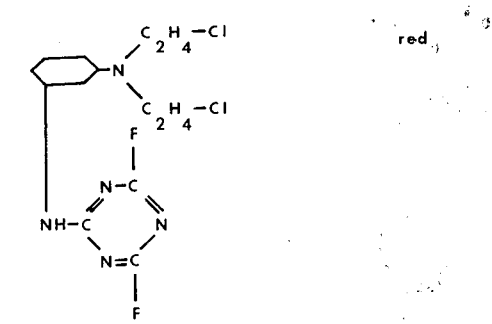 | red |

| No. | I | II | III |
|---|---|---|---|
| 55 | 2-Chloro-4-methyl-sulphonyl-aniline | [structure with N(C$_2$H$_4$-O-C$_2$H$_4$-CN)$_2$ and difluorotriazine NH linkage] | orange |
| 56 | 4-Aminosulphonyl-aniline | [structure with N(C$_2$H$_5$)(C$_2$H$_4$-C$_6$H$_5$) and difluorotriazine NH linkage] | yellow-orange |
| 57 | 2-Cyano-4-chlor-aniline | [structure with N(C$_2$H$_5$)-C$_2$H$_4$-N(CH$_3$)-difluorotriazine] | orange |
| 58 | 2-Chloro-4-methyl-sulphonyl-aniline | [structure with N(C$_2$H$_5$)-C$_2$H$_4$-N(CH$_3$)-difluorotriazine] | orange |
| 59 | 3-Amino-5-nitro-benzisothiazole | [structure with N(C$_2$H$_5$)-C$_2$H$_4$-N(CH$_3$)-difluorotriazine] | blue (on polyester) |
| 60 | 3-Amino-5-nitro-7-bromo-benzisothiazole | " | " |
| 61 | 3-Amino-benzisothiazole | " | blue-violet |
| 62 | 3-Amino-5-chloro-benzisothiazole | " | " |
| 63 | 3-Amino-7-chloro-benzisothiazole | " | " |

| No. | I | II | III |
| --- | --- | --- | --- |
| 64 | 3-Amino-4-chloro-benzisothiazole | " | " |
| 65 | 3-Amino-5-,7-dibromobenziso-thiazole | " | " |
| 66 | 3-Amino-5-chloro-7-bromo-benzisothiazole | " | " |

EXAMPLE 3

4 parts of 1-hydroxy-4-(*p*-aminophenyl)-aminoanthraquinone are suspended in 50 parts by volume of glacial acetic acid. A slight excess of trifluorotriazine is added thereto and the suspension is stirred for some time. Thereafter the mixture is poured into ice water and filtered, and the residue is well washed with water. After drying in vacuo, a dyestuff of the formula

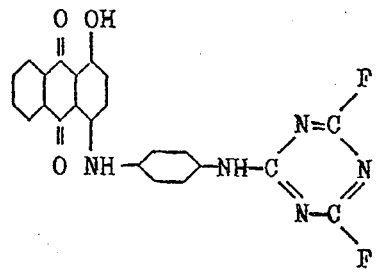

which dyes nylon fibres blue shades, is obtained.

The following products may be obtained analogously, starting from the appropriate aminoanthraquinones:

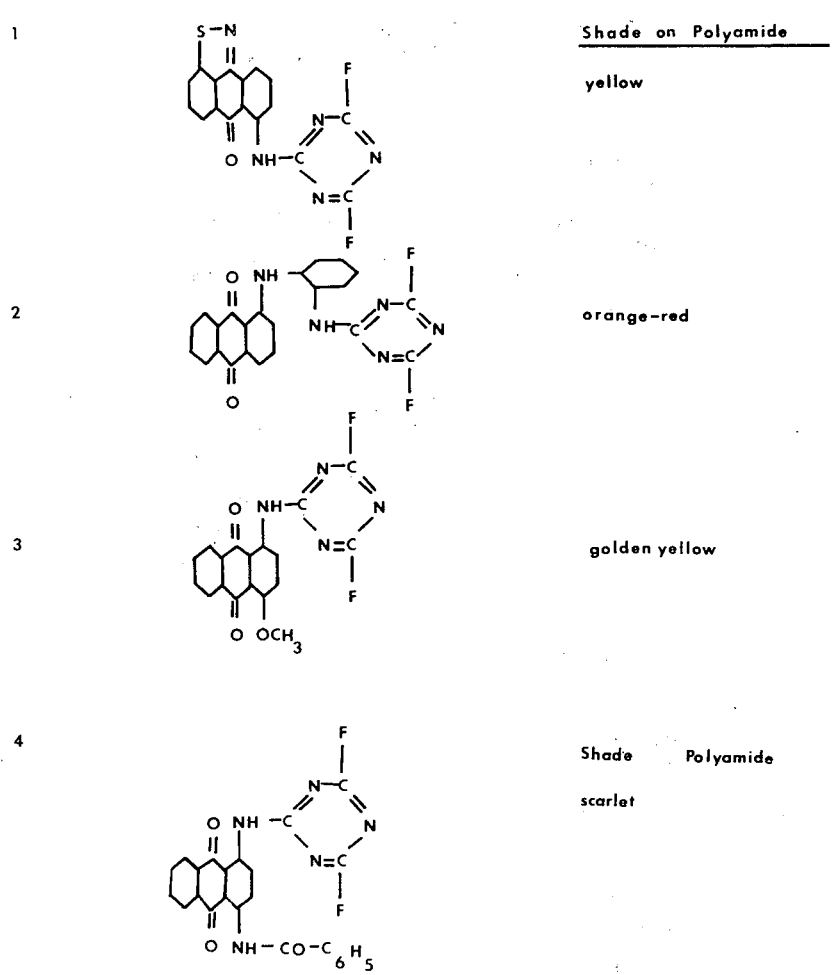

—Continued
| | | Shade on Polyamide |
|---|---|---|
| 5 | 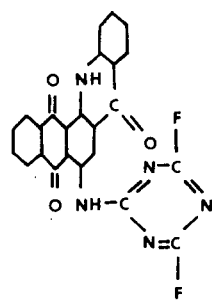 | blue |
| 6 | 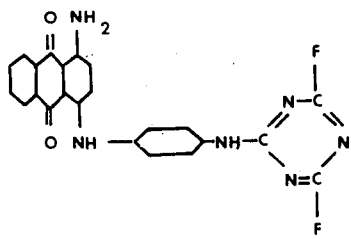 | blue |
| 7 | 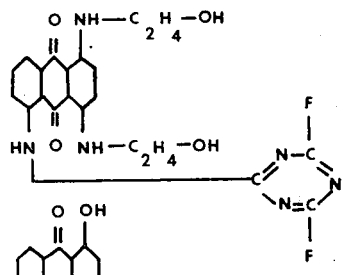 | blue |
| 8 | 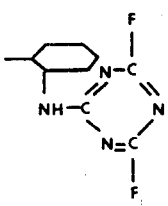 | blue |
| 9 | 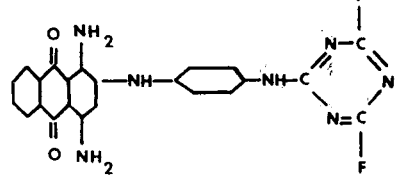 | blue |
| 10 | 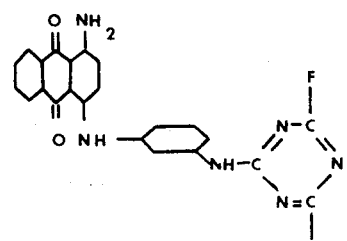 | blue |
| 11 | 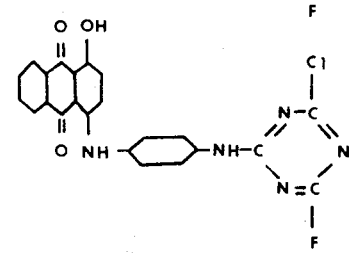 | blue |

EXAMPLE 4.

A slight excess of trifluorotriazine is added dropwise at room temperature to a suspension of 3.9 parts of 4′-thiophenoxy-1,2-naphthoylene-4-amino-benzimidazole in 80 parts of glacial acetic acid; the mixture is stirred overnight and the dyestuff is precipitated by adding ice water. After filtration, the dyestuff is washed until neutral and dried in vacuo. A dyestuff of the formula

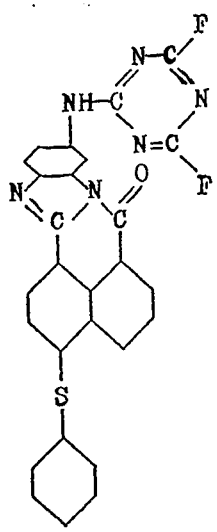

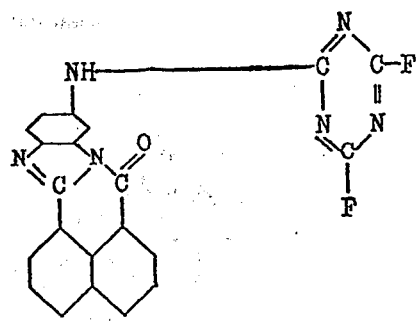

is obtained, which dyes polyamide and polyester fibres greenish-tinged yellow shades.

EXAMPLE 6.

2.3 parts of 3-chloro-4-amino-phenylmethylsulphone (90.5%) are diazotised at 20° to 25°C with 100 parts by volume of 0.5 N nitrosylsulphuric acid, and the mixture is stirred for one hour and then diluted with 20 parts by volume of a mixture of glacial acetic acid/propionic acid (6:1). This diazo solution is added dropwise at 0° to 5°C to a solution of 3.1 parts of the amine obtained in Preparation IV in 100 parts by volume of acetone. The coupling is complete after 3 hours. The dyestuff of the formula

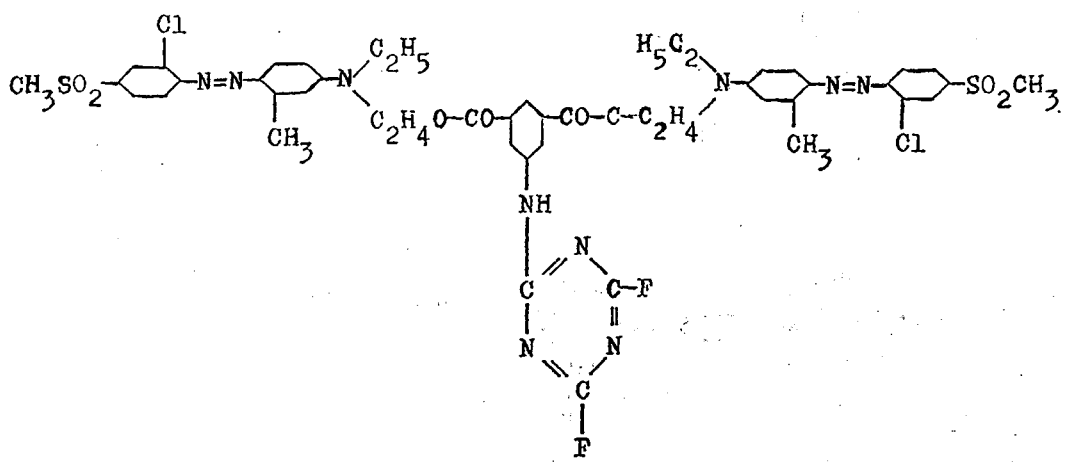

is obtained, which dyes polyamide and polyester fibres golden yellow shades having good general fastness properties.

is precipitated by adding sodium acetate solution, filtered off, washed until neutral and dried. An orange-red product is obtained, which dyes nylon fibres red shades.

EXAMPLE 5.

11.4 parts of 4-amino-naphthoylene-benzimidazole are suspended in 160 parts of glacial acetic acid. A slight excess of trifluorotriazine is added dropwise at 25°C, the mixture is warmed to 40°–45°C and stirred overnight, and the dyestuff is precipitated by adding ice water, filtered off, washed until neutral and dried in vacuo. A dyestuff of the formula

EXAMPLE 7.

4 parts of the compound of the formula

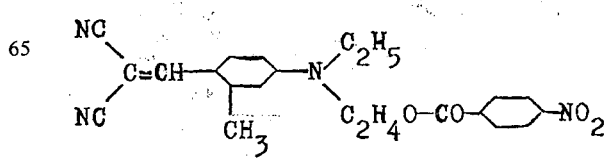

are hydrogenated in acetonitrile using a catalyst of 10% palladium on charcoal, until the amount of hydrogen required for the reduction of the nitro group has been taken up. No further starting material is detectable by a thin layer chromatogram. The acetonitrile is distilled off and the residue is reacted in glacial acetic acid with a slight excess of trifluorotriazine. The dyestuff of the formula which dyes nylon fibres greenish-tinged yellow shades, is obtained.

The same dyestuff may also be obtained by acylating the compound of the formula with the acid chloride of the formula

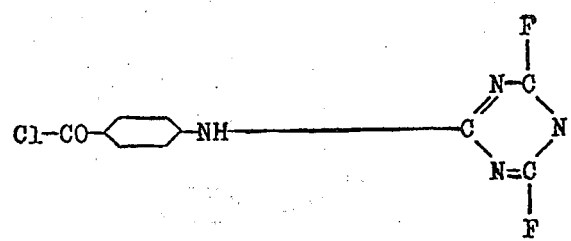

This acid chloride was obtained by acylation of p-aminobenzoic acid with trifluorotriazine and subsequent reaction with thionyl chloride.

The following dyestuffs, which all dye polyamides greenish-tinged yellow shades, may be obtained analogously.

4 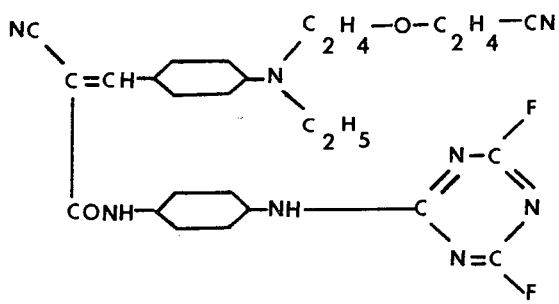
5 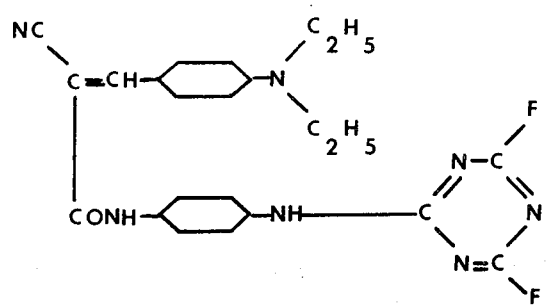
6 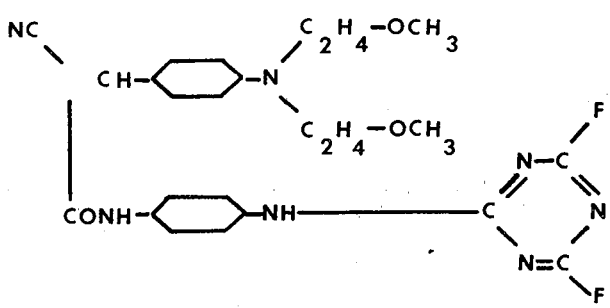
7 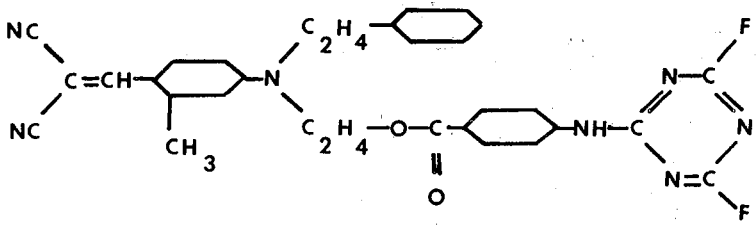
8 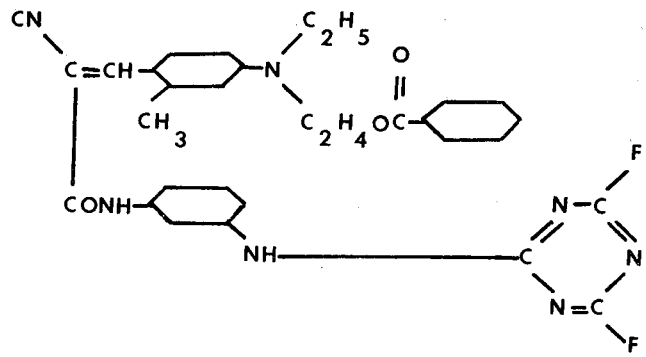

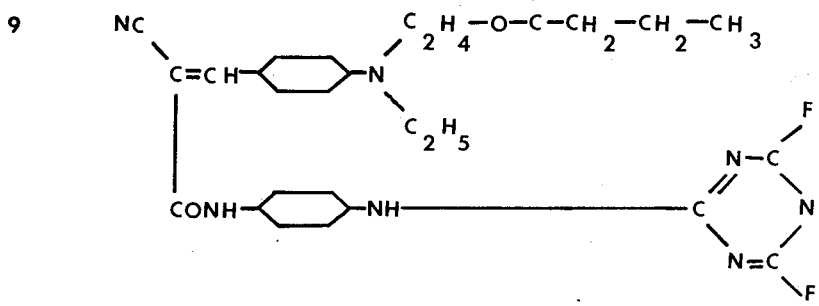
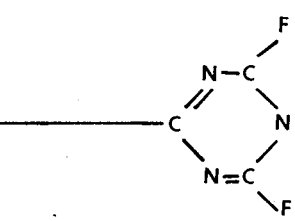

EXAMPLE 8.

Condensation of p-nitroaniline with cyanoacetic acid in toluene, with azeotropic removal of the resulting water, yields the derivative of the formula

4.3 parts of this product in 50 parts by volume of methanol and 5 drops of piperidine are condensed with 5.9 parts of N,N-di-β-acetoxyethyl-p-aminobenzaldehyde. The product of the formula

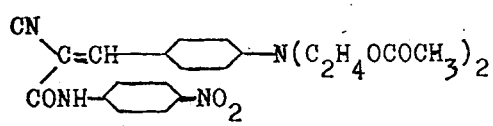

is obtained in good yield. Catalytic reduction thereof with Raney nickel in dimethylformamide until the amount of hydrogen required for the reduction of the nitro group has been taken up yields the product of the formula

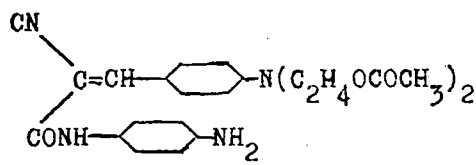

2.25 parts of this product in 20 parts by volume of glacial acetic acid are mixed at 15°–20°C with a slight excess of trifluorotriazine and the mixture stirred for 20 hours at 15°–20°C. The dyestuff of the formula

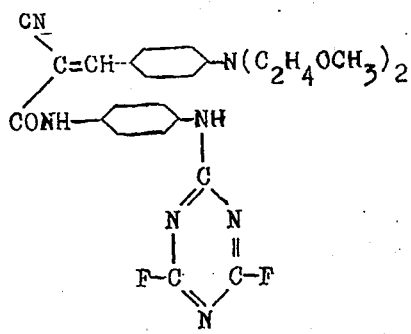

is filtered off, washed with methanol and dried. It dyes polyamide fibres vivid greenish-tinged yellow shades.

The dyestuff of the formula

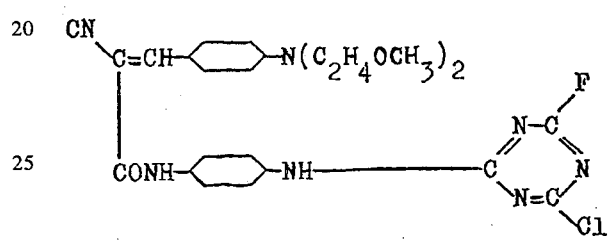

which dyes polyamide fibres greenish-tinged yellow shades, may be obtained analogously, by reaction with difluorochlorotriazine.

EXAMPLE 9.

19.55 parts of 3-amino-4-chlorobenzotrifluoride are diazotised in the customary manner and coupled with 19 parts of 1-(3'-aminophenyl)-3-methyl-5 -pyrazolone. The resulting monoazo dyestuff is isolated and dried.

19.77 parts of the dyestuff are stirred with 200 parts of toluene and treated dropwise over the course of 20 minutes, at 60°C, with a slight excess of trifluorotriazine in 20 parts of toluene. Thereafter the mixture is warmed to 60°C and stirred for 6 hours. After cooling, the dyestuff of the formula

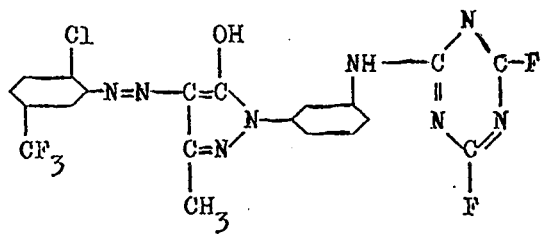

is isolated, washed with petroleum ether and dried. It is a yellow powder which dyes polyamide fibres attractive yellow shades having very good fastness properties.

A dyestuff with the same good properties may be obtained if 1-(4'-aminophenyl)-3-methyl-5 -pyrazolone is used as the coupling component.

The following dyestuffs, which dye polyamide fibres yellow shades and correspond to the formula

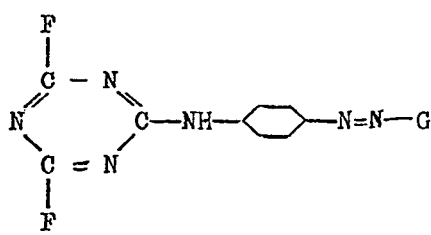

wherein G is one of the radicals of the formulae

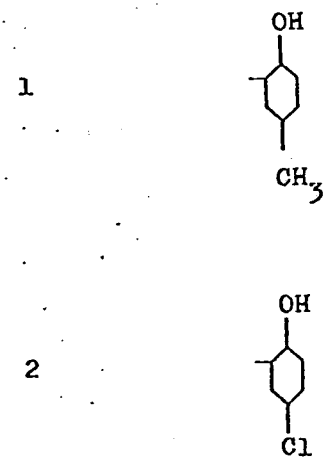

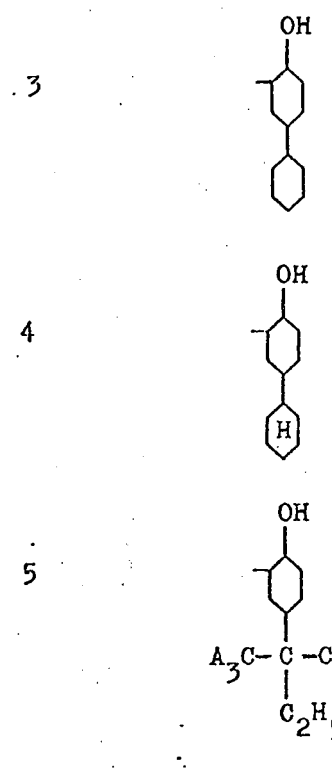

were manufactured analogously, as were the dyestuffs of the formulae

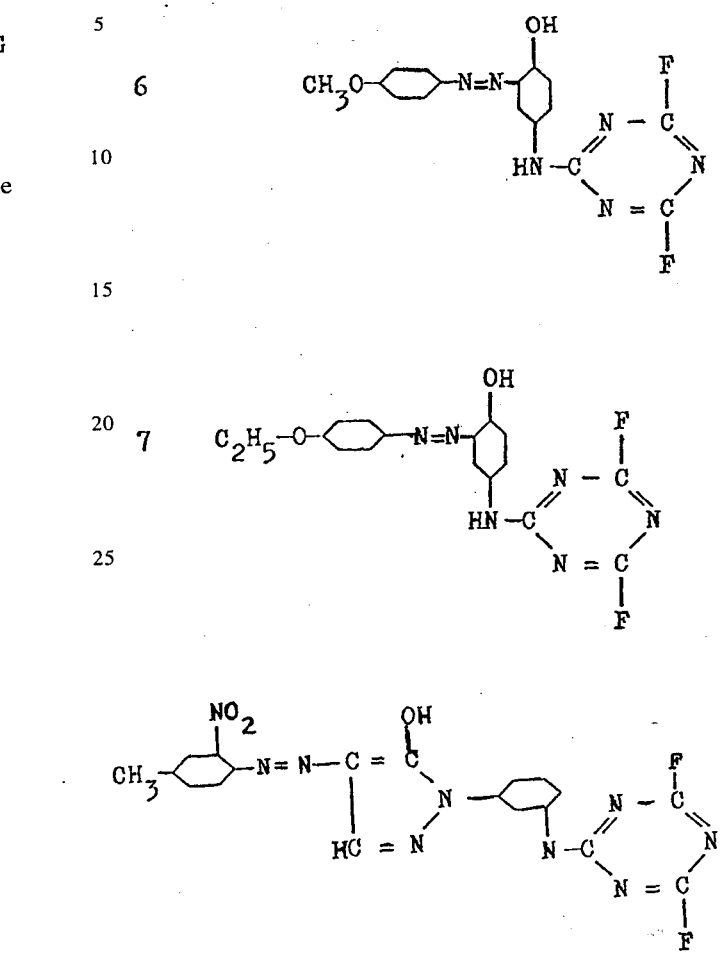

EXAMPLE 10.

33.6 parts of 4'-amino-3-nitro-diphenylamine-1-sulphonic acid N-ehtylamide are dissolved in glacial acetic acid and stirred with a slight excess of trifluorotriazine until the reaction is complete. The dyestuff is then precipitated by adding water and is isolated and dried in vacuo.

The dyestuff which is sparingly soluble in water but is soluble in organic solvents, of the formula

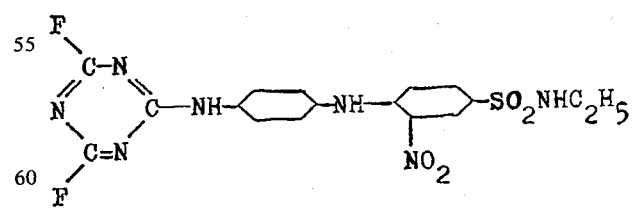

is a yellow powder which dyes polyamide fibres yellow shades having very good wet fastness properties.

EXAMPLE 11.

20.55 parts of 4-amino-3-chlorophenyl-methylsulphone are diazotised and coupled at 0°–5°C with 37.3 parts of 1-(difluorotriazinyl-)amino-7-hydroxynaphthalene in a weakly alkaline medium, to give a monoazo dyestuff.

The dyestuff which is insoluble in water but soluble in organic solvents; of the formula

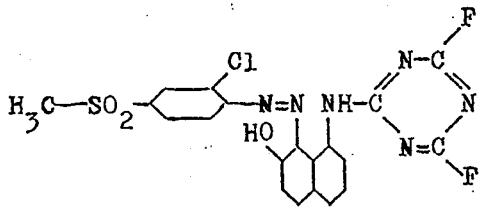

is isolated and dried in vacuo. It is a dark powder which dyes polyamide and wool fibres luminous scarlet-red shades having particularly good wet fastness properties.

EXAMPLE 12.

5.9 parts of 5-amino-1,9-pyrazolanthrone are suspended in chlorobenzene. A slight excess of trifluorotriazine is added dropwise at room temperature and the mixture is subsequently warmed to 80°C and stirred for some time. It is then allowed to cool, and the product is filtered off and washed with cold chlorobenzene. After drying in vacuo, a dyestuff is obtained which dyes polyamide yellow shades.

EXAMPLE 13.

10 parts of nylon-6,6 tricot fabric ("Helanca") are introduced at 30°C into a dyebath which contains 8 parts of sodium bicarbonate and 2 parts of a 5% strength aqueous dispersion of the dyestuff obtained according to Example 1 in 400 parts by volume of water, and which has a pH-value of 7.9. The temperature is raised to the boil over the course of 45 minutes and dyeing then carried out for 75 minutes at the boil. Thereafter the textile material is well rinsed with water and dried. A brilliant yellowish-tinged red dyeing, with a high proportion of non-extractable dyestuff, is obtained.

EXAMPLE 14.

The procedure of Example 13 is followed, but instead of the sodium bicarbonate 0.8 part of an adduct of 9 mols of ethylene oxide and 1 mol of nonylphenol is employed, with the pH-value of the dyebath being 7.0. A dyeing of similar brilliance to that in Example 13 is obtained.

EXAMPLE 15.

The procedure of Example 13 is followed but instead of the sodium bicarbonate 0.4 part of ammonium acetate is used and after 75 minutes 0.1 part of 80% strength acetic acid is added. After the addition of the acetic acid the pH-value of the dyebath is 5.6. 10 parts of nylon-6 tricot fabric ("Perlon") are used as the textile material. A dyeing of similar brilliance to that in Example 13 is obtained.

EXAMPLE 16.

The procedure of Example 12 is followed, but 10 parts of bleached wool tricot fabric are used as the textile material. A dyeing of similar brilliance to that in Example 12 is obtained.

If the fabric is subsequently boiled with an alkaline soap solution or a soda solution, particularly fast dyeings are obtained.

EXAMPLE 17.

A dyeing on 10 parts of polyester tricot fabric (texturised polyester fabric "Crimplent") is started at 30°C in a dyebath containing 0.8 part of an adduct of 9 mols of ethylene oxide and 1 mol of nonylphenol and 2 parts of a 5% strength dispersion of the dyestuff described in Example 1 in 400 parts of water, in a high temperature dyeing apparatus. The pH-value of the liquor is 7.0. The temperature is raised to 120°C in 15 minutes, whereby a pressure of about 2 atmospheres gauge is generated. Dyeing is then carried out for 45 minutes at 120°C and thereafter the system is cooled to 65°C over the course of 10 minutes. The textile material is then rinsed cold and is dried. A brilliant orange dyeing which is fast to boiling and washing, but is extractable, is obtained.

EXAMPLE 18.

Dyeing is carried out as described in Example 19, but a polyacrylonitrile high bulk tricot fabric (high bulk "Orlon" tricot) is used. A brilliant orange dyeing which is fast to boiling and washing, but is extractable, is obtained.

The dyestuff dispersions used above are obtained by grinding 20 parts of dyestuff with 140 parts of water and 40 parts of sodium dinaphthylmethanedisulphonate.

EXAMPLE 19.

10 parts of nylon-6,6 tricot fabric ("Helanca") are introduced at 30°C into a dyebath which contains 0.2 part of 80% strength acetic acid and 2 parts of a 5% strength aqueous dispersion of the dyestuff obtained according to Example 1 in 400 parts by volume of water, and which has a pH-value of 4–5. The temperature is raised to the boil over the course of 45 minutes and dyeing is then carried out at the boil for 30 minutes. Thereafter the bath is adjusted to a pH-value of 12 by adding sodium carbonate and boiled for a further 30 minutes. Hereupon the textile material is well rinsed with water and dried. A brilliant yellowish-tinged red dyeing with a high proportion of non-extractable dyestuff is obtained.

EXAMPLE 20.

10 parts of nylon-6,6 tricot fabric ("Helanca") are introduced at 30°C into a dyebath which contains 0.2 part of 80% strength acetic acid and 2 parts of a 5% strength aqueous dispersion of the dyestuff obtained according to Example 1 in 400 parts by volume of water, and which has a pH-value of 4–5. The temperature is raised to 70°C over the course of 60 minutes and maintained thereat for 15 minutes, raised to the boil over the course of 30 minutes, and dyeing carried out at the boil for 60 minutes. Thereafter the textile material is well rinsed with water and dried. A brilliant yellowish-tinged red dyeing with a high proportion of non-extractable dyestuff is obtained.

We claim:

1. A monoazo dyestuff of the formula

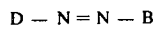

wherein

D is thiazole, benzothiazole, pyridine, triazole, pyrazole, imidazole, thiadiazole, isothiazole or benzisothiazole, which is unsubstituted or substituted by a member selected from the group consisting of nitro cyano, methyl, methylsulphonyl, bromine, acetylamino, phenyl, chlorine, methoxy, ethoxy, thiocyano, and carbethoxy, and B is a member selected from the group consisting of c and d each are hydrogen, $C_1$–$C_4$-alkyl, $C_1$–$C_4$-alkoxy, phenylthio or phenoxy, and c in addition is chlorine, bromine, trifluoromethyl, -$CONH_2$, $C_1$–$C_4$-alkylcarbonylamino, benzoylamino, pyridine carbonylamino, thiophencarbonylamino, chloroacetylamino, methylsulfonylamino, ethylsulfonylamino, p-toluenesulfonylamino, $C_1$–$C_4$-alkoxy-carbonylamino or phenoxycarbonylamino, $R_1$ is unsubstituted $C_1$–$C_4$-alkyl or $C_1$–$C_4$-alkyl substituted by halogen, hydroxy, phenyl, cyanoethoxy, $C_1$–$C_4$-alkoxy, $C_1$–$C_3$-alkoxy-carbonyl, formylamino, $C_1$–$C_4$-alkylcarbonyloxy, $C_1$–$C_4$-alkylcarbamoyloxy, phenylcarbamoyloxy, $C_1$–$C_3$-alkyloxycarbonyloxy or benzoyloxy;

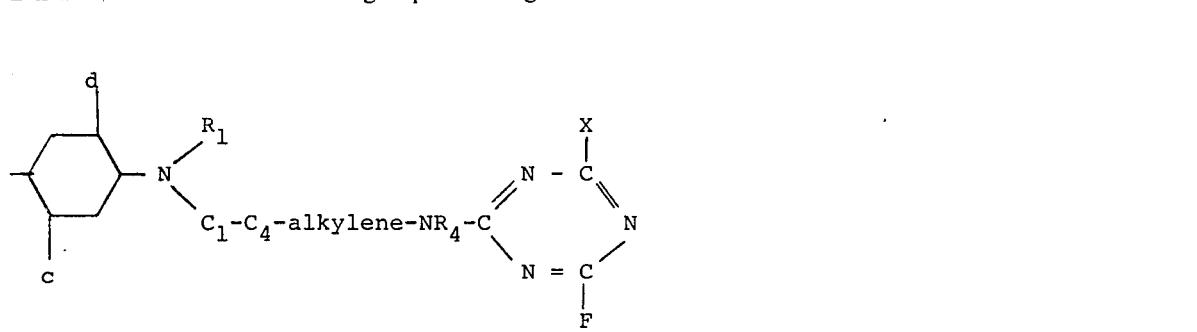

and

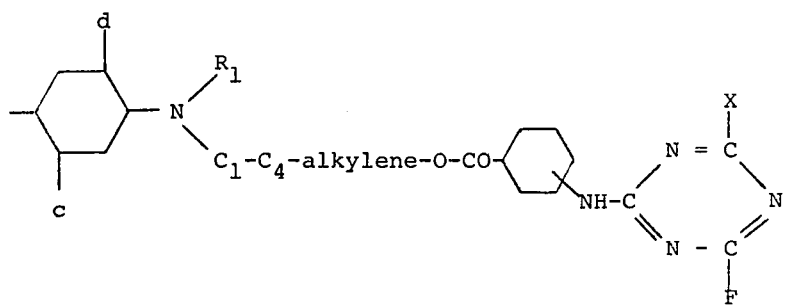

" and

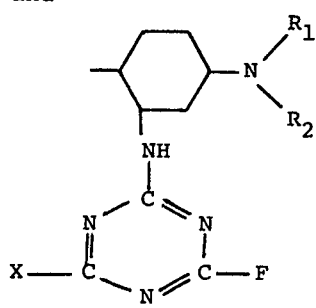

$R_4$ is hydrogen or $C_1$–$C_4$ alkyl and

X is chlorine or fluorine.

2. A dyestuff as claimed in claim 1 wherein X is fluorine.

3. A dyestuff as claimed in claim 1 wherein X is chlorine.

4. A dyestuff according to claim 1 of the formula

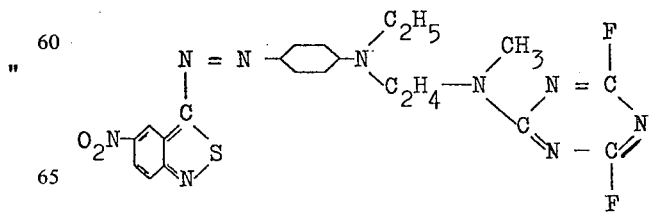

wherein